(12) United States Patent
Muschler et al.

(10) Patent No.: US 7,796,815 B2
(45) Date of Patent: Sep. 14, 2010

(54) IMAGE ANALYSIS OF BIOLOGICAL OBJECTS

(75) Inventors: George F. Muschler, Cleveland Heights, OH (US); Kimerly A. Powell, Lake Forest Park, WA (US); Jason Allen Bryan, Avon Lake, OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 1132 days.

(21) Appl. No.: 11/450,125

(22) Filed: Jun. 9, 2006

(65) Prior Publication Data
US 2006/0280352 A1 Dec. 14, 2006

Related U.S. Application Data

(60) Provisional application No. 60/689,418, filed on Jun. 10, 2005.

(51) Int. Cl.
G06K 9/34 (2006.01)
G06K 9/00 (2006.01)

(52) U.S. Cl. ...................... 382/173; 382/133
(58) Field of Classification Search ......... 382/128–134, 382/173, 224–225, 270–272; 702/19–22
See application file for complete search history.

(56) References Cited

U.S. PATENT DOCUMENTS

| | | | |
|---|---|---|---|
| 5,978,498 A * | 11/1999 | Wilhelm et al. ............. 382/133 |
| 6,101,265 A | 8/2000 | Bacus et al. | |
| 6,226,392 B1 | 5/2001 | Bacus et al. | |
| 6,252,979 B1 | 6/2001 | Lee et al. | |
| 6,466,690 B2 | 10/2002 | Bacus et al. | |
| 6,674,881 B2 | 1/2004 | Bacus et al. | |
| 6,674,884 B2 | 1/2004 | Bacus et al. | |
| 6,775,402 B2 | 8/2004 | Bacus et al. | |
| 7,218,764 B2 * | 5/2007 | Vaisberg et al. ............. 382/129 |
| 7,496,220 B2 * | 2/2009 | Izzia et al. .................. 382/128 |
| 7,590,492 B2 * | 9/2009 | Zahniser et al. ............... 702/19 |
| 2004/0236773 A1 | 11/2004 | Bacus et al. | |
| 2005/0254696 A1 | 11/2005 | Bacus et al. | |

* cited by examiner

*Primary Examiner*—Sherali Ishrat
(74) *Attorney, Agent, or Firm*—Tarolli, Sundheim, Covell & Tummino LLP

(57) ABSTRACT

Systems and methods are described for performing image analysis. A computer-implemented method for analyzing images may include quantitatively analyzing image data to identify image objects relative to a background portion of the image according to predefined object criteria, the image data including a plurality of image objects that represent objects in a sample distributed across a substrate. The identified image objects are further clustered into groups or colonies of the identified image objects according to predetermined clustering criteria.

46 Claims, 11 Drawing Sheets

IMAGE ANALYSIS OF BIOLOGICAL OBJECTS

RELATED APPLICATION

This application claims the benefit of U.S. Provisional Patent Application No. 60/689,418, which was filed Jun. 10, 2005, and entitled IMAGE ANALYSIS OF BIOLOGICAL OBJECTS, the entire contents of which is incorporated herein by reference.

BACKGROUND

Various techniques exist to implement microscope-based imaging of biological objects, including cells and collections of cells, such as tissue. A traditional approach utilizes conventional light microscopy combined with one or more light filters and computer software programs for analyzing the image acquired from the microscope. The wavelengths of the light filters can be matched to the colors of the stain and counterstain. The filters allow a technician to identify, classify and then measure differences in the optical density of specific colors of light transmitted through stained portions of tissue sections. Some more advanced imaging systems may perform limited automated recognition of features. The feature recognition further may be combined with automated calculation of feature areas, automated calibration, and automatic calculation of average and integrated optical density.

These and other techniques of microscope-based imaging are widely used in a variety of research and diagnostic applications. One particular application relates to analysis of progenitor cells, which are cells capable of differentiating into one or more different cell types. As an example, one type of progenitor cell is a connective tissue progenitor (CTP) cell. CTP cells are defined as cells that are resident in tissue that can contribute to new tissue formation by giving rise to daughter cells that are capable of differentiating into one or more connective tissue phenotypes (e.g., bone, cartilage, muscle, fibrous tissue, adipose tissue). CTPs include both relatively committed progenitor cells and also a smaller population of upstream multipotent stem cells.

Traditionally, assays of CTPs from bone marrow and other tissues have been performed using colony-forming assays. In these assays, CTPs are plated in-vitro, allowed to attach to a substrate, and detected based upon the appearance of a colony of progeny that form around the original site of attachment. The number of colonies is used as a measure of the colony forming units (CFUs) in the sample. This data in turn can be interpreted to provide information about the concentration and prevalence of CTPs in the original tissue that are activated to proliferate or differentiate under specified experimental conditions.

The number of colonies in a cell culture is typically manually counted, which can be a highly subjective and time consuming process. Automated methods for counting colonies have been developed for bone marrow and hematopoietic colonies; however, detailed information describing colony or cell morphology has not been characterized using any automated image analysis method. The only approach currently available for assessing the performance of the progeny is to employ subcloning strategies. This type of analysis is time consuming, costly, and labor intensive. Furthermore, the cloning is inevitably associated with selective pressures that are likely to alter the characteristics of the subcloned population from that in the original sample.

SUMMARY

The present invention relates to systems and methods for image analysis. One aspect of the present invention provides a computer-implemented method for analyzing images may include quantitatively analyzing image data to identify image objects relative to a background portion of the image according to predefined criteria, the image data including a plurality of image objects that represent objects in a sample distributed across a substrate. The identified image objects are further clustered into groups or colonies of the identified image objects according to predetermined clustering criteria.

Another aspect of the present invention provides an image analysis system that includes an image acquisition system that provides image data that defines an image having a plurality of image objects that represent corresponding objects in a sample. An analysis engine segments image objects relative to image background according to predefined object criteria to provide a segmented image. The analysis engine also clusters image objects in the segmented image into groups or colonies of the image objects according to predetermined clustering criteria.

The present invention can be applied to various types of objects in a sample including, but not limited to cells, different components within cells (e.g., organelles, proteins or other molecules), microorganisms (e.g., bacteria, protozoa), viruses, as well as other related objects that can be logically clustered into groups. The present invention can be utilized to characterize objects and groups or colonies of objects (e.g., cells, such as progenitor cells) with increased efficiency. The present invention can also be utilized to identify objects such as cells or colonies that have specific desired characteristics and their precise location on a two dimensional surface. The location and dimension of the cell or colony of interest can then be linked to a manual or automated collection system that allows collection of material and/or cells from the desired colony or group for subsequent use or analysis.

DETAILED DESCRIPTION

Figure 1:
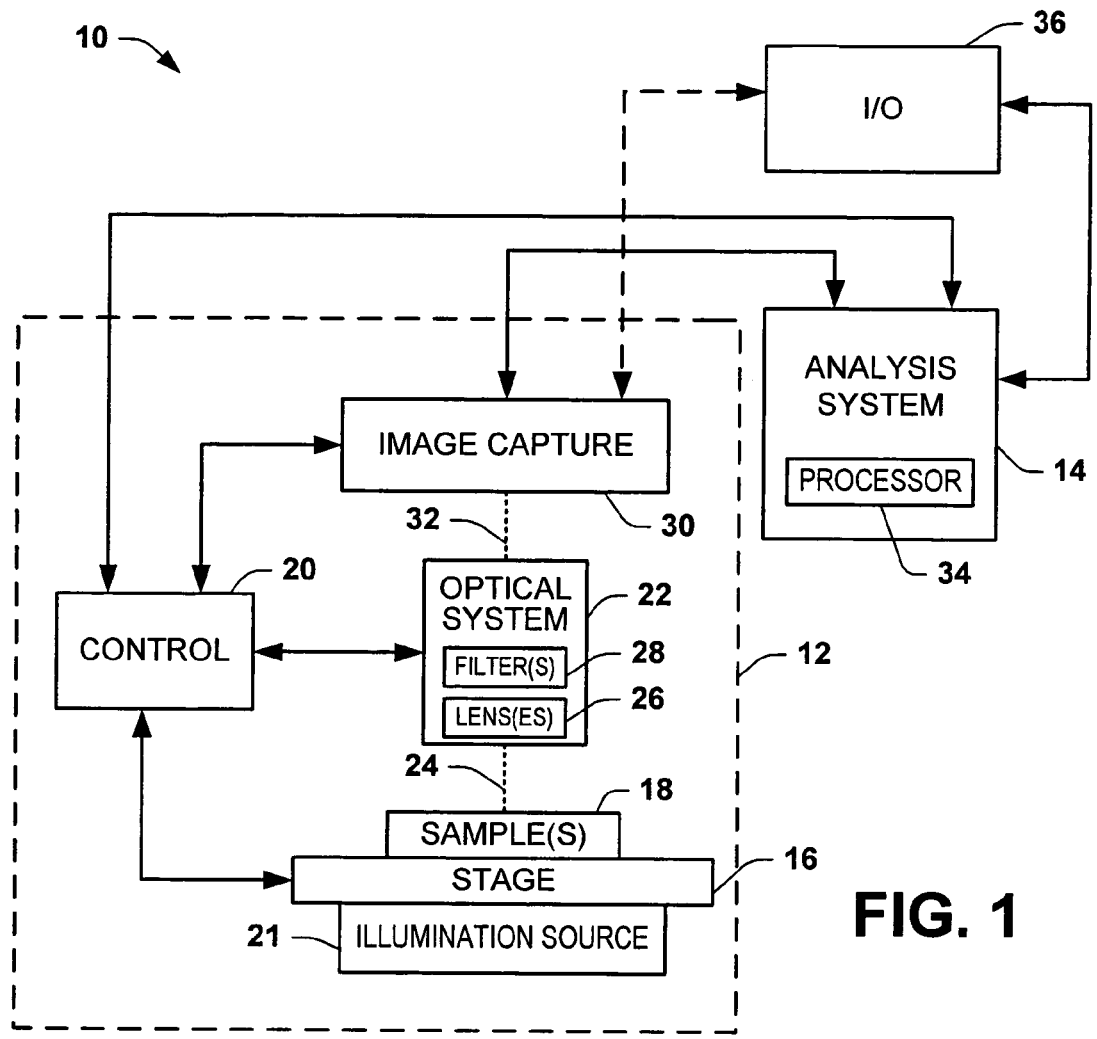
FIG. 1 depicts an example of a system for image acquisition and processing that can be implemented in accordance with an aspect of the present invention.

FIG. 1 depicts an example of a system 10 that can be utilized to acquire and analyze images according to an aspect of the present invention. The system 10 includes an image acquisition system 12 that provides image data to an analysis system 14. The analysis system 14 is programmed to perform quantitative analysis on the image data and to characterize image data in a process that can be (wholly or partially) automated. Thus, the analysis system 14 can provide quantitative information about morphology (e.g., form, content and/or structure) of colonies and cells with a greater efficiency than many conventional approaches.

By way of example, FIG. 1 illustrates a schematic representation of the image acquisition system 12. The image acquisition system includes a stage 16 on which one or more samples 18 can be positioned. The one or more samples 18 can include to biological and/or chemical samples. For the example where the image acquisition system 12 includes a microscope, the one or more samples 18 can be provided as plated slides that contain cultures corresponding to the biological and/or chemical samples, such as colony forming assays of cells, such as progenitor cells. The cells may be alive during (as well as after) the image capture process or, alternatively, the cells may be dead during image capture.

As one example, the one or more samples 18 can include nucleated connective tissue progenitor (CTP) cells plated at a desired density (e.g., approximately $5 \times 10^5$ cells in each of two 4 cm$^2$ culture wells) on a glass chamber slide. The nucleated cells can be derived from a heparinized bone marrow suspension after appropriate centrifuging. The buffy coat can be isolated and re-suspended in α-MEM containing 10% fetal bovine serum, and 50 µg/ml sodium ascorbate. The cultures may be maintained at 37° C. in a humidified atmosphere of 5% $CO_2$ in air. The medium may changed after twenty-four hours and then again on day three. The cultures can subsequently be fixed (e.g., on day six, such as with a ratio of acetone:methanol=1:1) and stored at room temperature until further analysis in accordance with an aspect of the present invention.

One or more types of marker criteria can be utilized to differentiate or optically label structures and/or chemical features in a given image. Examples of some marker criteria include staining (e.g., with one or more dyes), employing phase contrast microscopy, topographic image mapping of a two-dimensional surface. Additionally or alternatively, for various types of cells the marker criteria can include an immunochemical marker, a histochemical marker, as well as an in situ hybridization marker. Those skilled in the art will understand and appreciate particular applications of these and other types of marker criteria that can be used to optically identify objects and/or chemical features in an image.

As one particular example, characteristics that can be revealed by in situ hybridization of cells include in situ characteristics of telomeres. Telomeres are terminal sections of eukaryotic chromosomes. Telomeres can be extended by telomerases, which are specialized reverse transcriptase enzymes that are involved in synthesis of telomeres in humans and many other animals. For example, telomerase is an enzyme that can be employed to maintain or increase telomere length. Human telomerase is composed of at least two sub-units, human Telomerase Reverse Transcriptase (TERT) and human Telomerase RNA (hTR or TERC). The image analysis, including clustering and correlation of images, for a given sample can be applied to ascertain a measure the physical length of telomeres in identified colonies of cells. Alternatively or additionally, one or more markers can be applied to determine if cells or the matrix of materials adjacent the cells within a given colony express a telomerase (e.g., TERT or TERC) enzyme and/or to detect other proteins deemed relevant to the one or more telomere characteristics, such as the presence of telomeres at terminal ends of chromosomes or the length of the telomeres.

By way of further example, the fixed cultures can be stained to ascertain whether the one or more objects in the sample(s) 18 might express a specific marker. One or more stains can be utilized for each of the one or more samples 18. For example, one or more sets of images can be acquired for the one or more samples without staining, and one or more separate image sets can for each stain that is applied, such as described herein. When separate sets of images are collected for different stains, the same field-of-view can be utilized so that the positive-stained areas can be cross-correlated for quantitative analysis.

As one example, a fluorescent dye, such as DAPI (e.g., 4',6-diamino-2-phenylindole dihydrochloride) can be utilized as a staining medium. DAPI is a fluorescent dye that binds to nuclear DNA. The DAPI stain can be applied to the fixed cells. For instance, the fixed samples can be hydrated with deionized water and stained with DAPI (0.75 µg/ml in phosphate buffer) for a predetermined time period (e.g., 10 minutes), and then rinsed with deionized water. DAPI is known as marker for identifying various types of cells and, in particular, cell nuclei, by causing cell nuclei to fluoresce.

As another example, alkaline phosphatase (AP) staining can be applied to the fixed sample by hydrating and incubating cell layers for a predetermined period of time under predefined conditions (e.g. 30 minutes at 37° C. in 120 mM Tris Buffer, pH 8.4, containing 0.9 mM Naphtol AS-MX Phosphate and 1.8 mM Fast Red TR (Sigma-Aldrich, Steinheim, Germany), and then washed with deionized water. Since undifferentiated progenitor cells tend to express high levels of AP on their cell surface, AP staining can be employed as a mechanism to analyze undifferentiated progenitor cells, for example.

AP and DAPI stains can be utilized together on a given sample, such as for locating cells (e.g., via DAPI or other staining) as well as analyzing performance characteristics of certain types of cells (e.g., via AP or other staining). It is to be appreciated that other stains or dyes can also be utilized in addition to or as an alternative to AP and/or DAPI staining. The particular types of staining employed can vary according to the types of objects being selectively stained. For example, specific types of cells, different components within cells (e.g., organelles, proteins or other molecules) as well as other objects can be selectively stained and provided as the one or more samples 18. The system 10 can be employed to acquire and analyze images of such objects in accordance with an aspect of the present invention.

The stage 16 can be fixed or moveable depending on the implementation of the image acquisition system 12. As an example, the image acquisition system 12 also includes a control block 20 that is programmed and configured to effect desired movement of the stage 16. For instance, the control 20 can correspond to a two-dimensional (e.g., X-Y) stage device control that is operative to move the stage 16 relative to an associated optical system 22. The plane is substantially perpendicular to a light path, indicated at 24, for the optical system. Alternatively or additionally, the control 20 can be configured as a Z-axis device control for effecting movement of the stage substantially parallel to the light path 24 (e.g., in a transverse direction relative to the optical system 24). The control 20 thus can move the one or more samples with the stage 16 for scanning sequential images automatically, such as described herein, to acquire a matrix of images over the entire cell culture field-of-view. The matrix further can include samples on one or more slides.

An illumination source 21 can provide light to illuminate the sample(s) 18 to facilitate image capture. The illumination source 21 can provide light at a desired wavelength or range of wavelengths, which can be user selectable (e.g., manually or via the control block 20). While the illumination source 21 is depicted as positioned below the stage 16 in the schematic example of FIG. 1, it is to be understood that the illumination source can be implemented as one or more light source that can occupy one or more other positions, such as above, below, and/or lateral to the stage 16.

The optical system 22 can be implemented as a microscope or other optical instrument capable of producing a magnified image of one or more objects. While many examples herein describe the objects as including cells, it is to be understood and appreciated that the system and methods are not limited in application to cells as images of other types of objects can also be processed according to an aspect of the present invention. By way of example, the objects can also cells, microorganisms (e.g., bacteria, protozoa), cell nuclei, cell organelles, viruses, non-biological structures, different constituent parts of such objects or any combination of one or more of such objects.

The optical system 22 can include one or more lenses 26 that can be selected and placed in the optical path for magnifying the image to a desired level. The optical system 22 can also utilize one or more filters (e.g., in the form of a filter wheel) 28 for selectively filtering out different wavelengths of light. As an example, different filters can be employed based on stains that have been applied to the one or more samples 18 to facilitate a determination whether the cells (or other objects in the sample) might express a particular marker. The control 20 can also be employed to control the optical system 22, such by implementing automatic (e.g., digital) focus or selecting combinations of lenses and filters. As one example, the optical system can employ a 10× objective (e.g., having a magnification of approximately 100×).

Those skilled in the art will understand and appreciate various types and models of optical microscopes and arrangements of lenses and filters that can be utilized to form the optical system 22. Examples of suitable microscopes are commercially available under brand names including Leica, Nikon, Olympus, and Zeiss, to name a few.

The image acquisition system 12 can also include an image capture device 30. The image capture device can be implemented as including one or more sensors arranged to detect light, indicated at 32, from the optical system 22. The image capture device 30 can include a sensor of substantially any size, shape and/or technology. By way of example, the image capture device may comprise an arrangement of one or more digital sensors, analog sensors, charge coupled device (CCD) sensor, complementary metal oxide semiconductor (CMOS) sensor, charge injection device (CID) sensor. The arrangement may be implemented as an array, such as a linear or two-dimensional array. The one or more sensors, for instance, can be implemented in a digital camera. The image capture device 30 provides an output signal corresponding to image data in response to detecting light (e.g., visible or non-visible light) from the optical system 22. For the above example of using a 10× objective, the image acquisition system can be employed to collect separate images with a desired array of pixels (e.g., approximately 461×344 pixels—providing a pixel size of about 3.56 μm). The image data can be stored locally or remotely, such as in a memory (not shown). The image data, for example, represents a wavelength and intensity level for each of the pixels in the acquired image.

In the example of FIG. 1, the analysis system 14 receives the image data for implementing quantitative analysis in accordance with an aspect of the present invention. The analysis system 14 can be implemented as a computer system that includes one or more processors 34 for executing computer-executable instructions. The analysis system 34 thus can be programmed to process and analyze the image data. The analysis system can be directly coupled with the image acquisition system 12 or it may be remotely located. The analysis of the image data can be performed as an offline or batch process based on the acquired image data. Alternatively or additionally, some or all of the analysis and image processing can be implemented substantially concurrently with acquisition of the image data.

The system 10 can also include one or more input/output (I/O) devices 36. For example, the I/O device(s) 36 can include essentially any type of user input devices (e.g., mouse, keyboard and the like), displays, printers or other peripherals. The I/O device(s) 36 that can be employed to input instructions or set parameters associated with image acquisition and/or associated with the analysis of the image data. For example, the image data can also be utilized to display a representation of the acquired image, such as on a display device (corresponding to I/O device 36), such as directly from the memory (not shown) where the acquired image data is stored or from the analysis system 14. The I/O device(s) 36 can also be utilized to display graphical user interface elements associated with the operation and control of the image acquisition system 12 and/or the image analysis system 14.

The analysis system 14 can perform analysis on background-corrected representations of acquired images. As one example, software (running in the same or different computer as the analysis system 14) can perform background correction to each image by subtracting a smoothed background image from each individual image of the matrix. The background image can be acquired from a blank region of the sample 18, which is smoothed by utilizing an averaging filter (e.g., a 15×15 square average filter). This background correction mitigates the spatial variation in background intensity observed as a result of the fluorescent bulb and the average filter accounts for any small debris present in the background image.

The analysis system 14 is programmed to quantitatively analyze the acquired image data to identify and characterize image objects according to an aspect of the present invention. Thus, a first step is to acquire the image data for the one or more samples 18. The image acquisition system 12 may obtain a plurality of images for the one or more samples that are aggregated or assembled together to provide a montage, which is formed from assembling several images, each of which corresponds to part of the one more samples 18.

Figure 2:
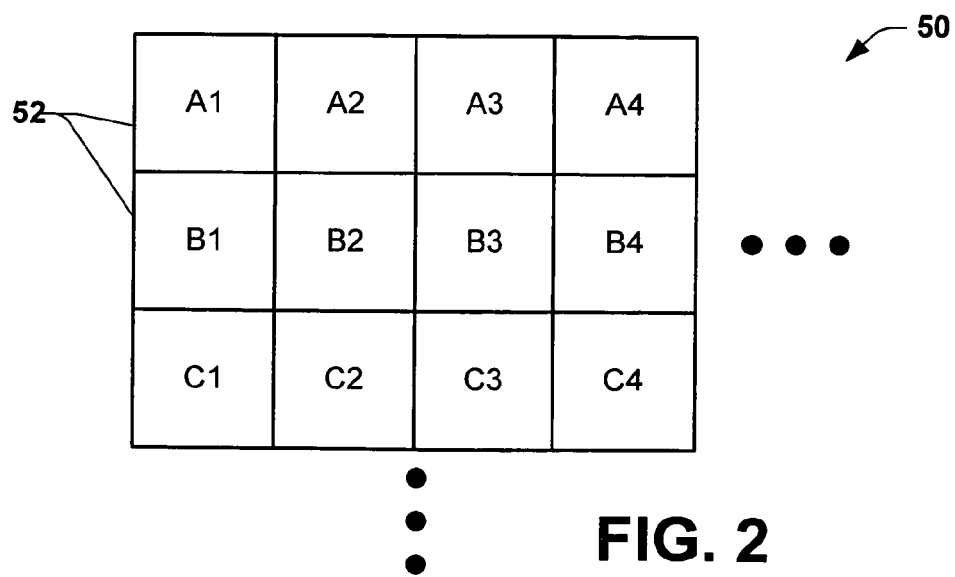
FIG. 2 depicts an example of a montaged image that can be acquired by the system of FIG. 1.

FIG. 2 depicts a schematic example of part of a montage 50 that can be constructed based on a number of separate images 52 corresponding to different parts of the one or more samples 18. In FIG. 2, the montage 50 includes matrix of respective images 52 that include a plurality of rows and columns of respective images. The control block 20 alone or in combination with software running on the analysis system 14, for example, can control the stage 16 to acquire sequential images automatically, such as across each respective row (or column). As one example, a 20×24 matrix of images 52 can be acquired over the entire sample 18 for a cell culture field-of-view (2.0 cm×2.0 cm), although other size matrices and fields of view can also be utilized to provide the resulting montage 50.

Additionally, separate sets of images can be acquired for different staining implemented on the one or more samples, such as by employing appropriate filters 28 to enable collection of reflected light at wavelengths known to be transmitted through such filters. The sets of images for different stains (as well as without stain) can be collected for the same field-of-view, so that corresponding parts of the respective images can be co-localized for quantitative analysis. The particular filter(s) 28 used during each image acquisition session can be selected depending on which stain (or stains) have been applied. For the example of DAPI and AP staining, corresponding filter sets can be used to enable collection of the DAPI images (e.g., 340-380 nm excitation) and the AP images (e.g., 480/40 nm excitation).

Figure 3A:
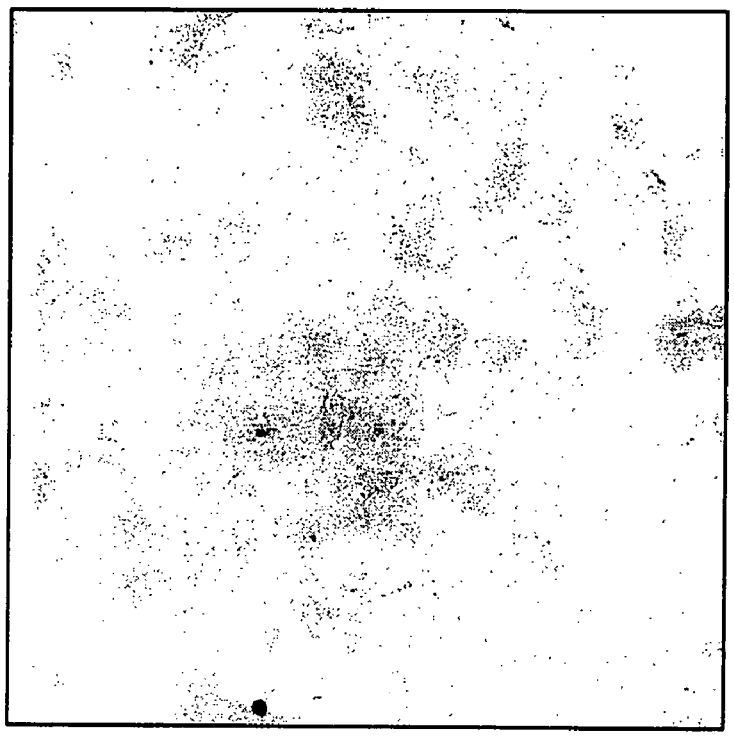
FIG. 3A depicts a background corrected montaged image employing first marker criteria for use in image analysis in accordance with an aspect of the present invention.
Figure 3B:
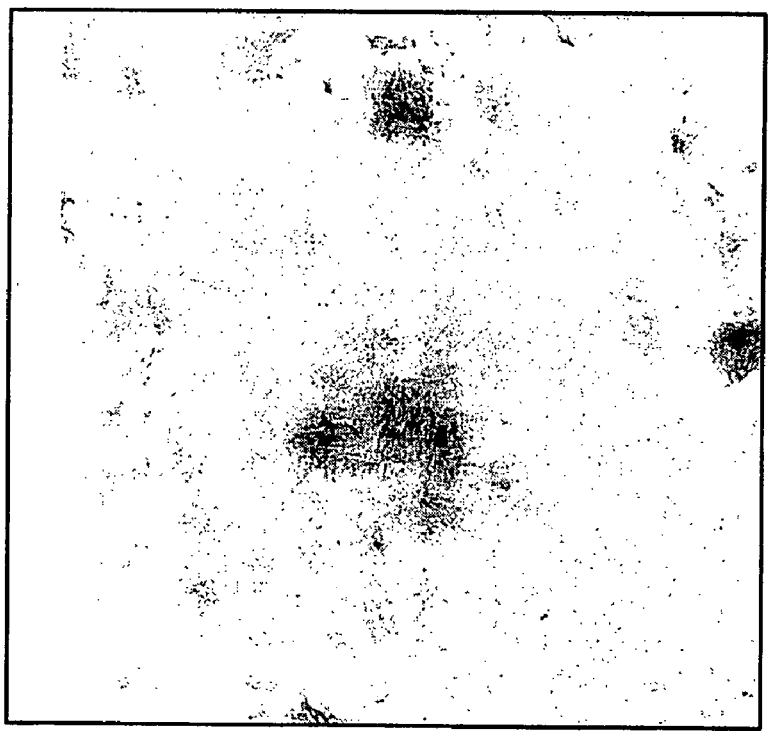
FIG. 3B depicts a background corrected montaged image employing second marker criteria for use in image analysis in accordance with an aspect of the present invention.

Each of the images 52 in the montage 50 for each image set can be a background-corrected image, as mentioned above. The individual background-corrected images can then be combined to provide a montage corresponding to one entire background-corrected image of the sample 18 (6915×6880 pixels). An example of a background-corrected montage of DAPI images for a given sample 18 is depicted in FIG. 3A and a background corrected montage of AP images for the same sample is depicted FIG. 3B.

Figure 4:
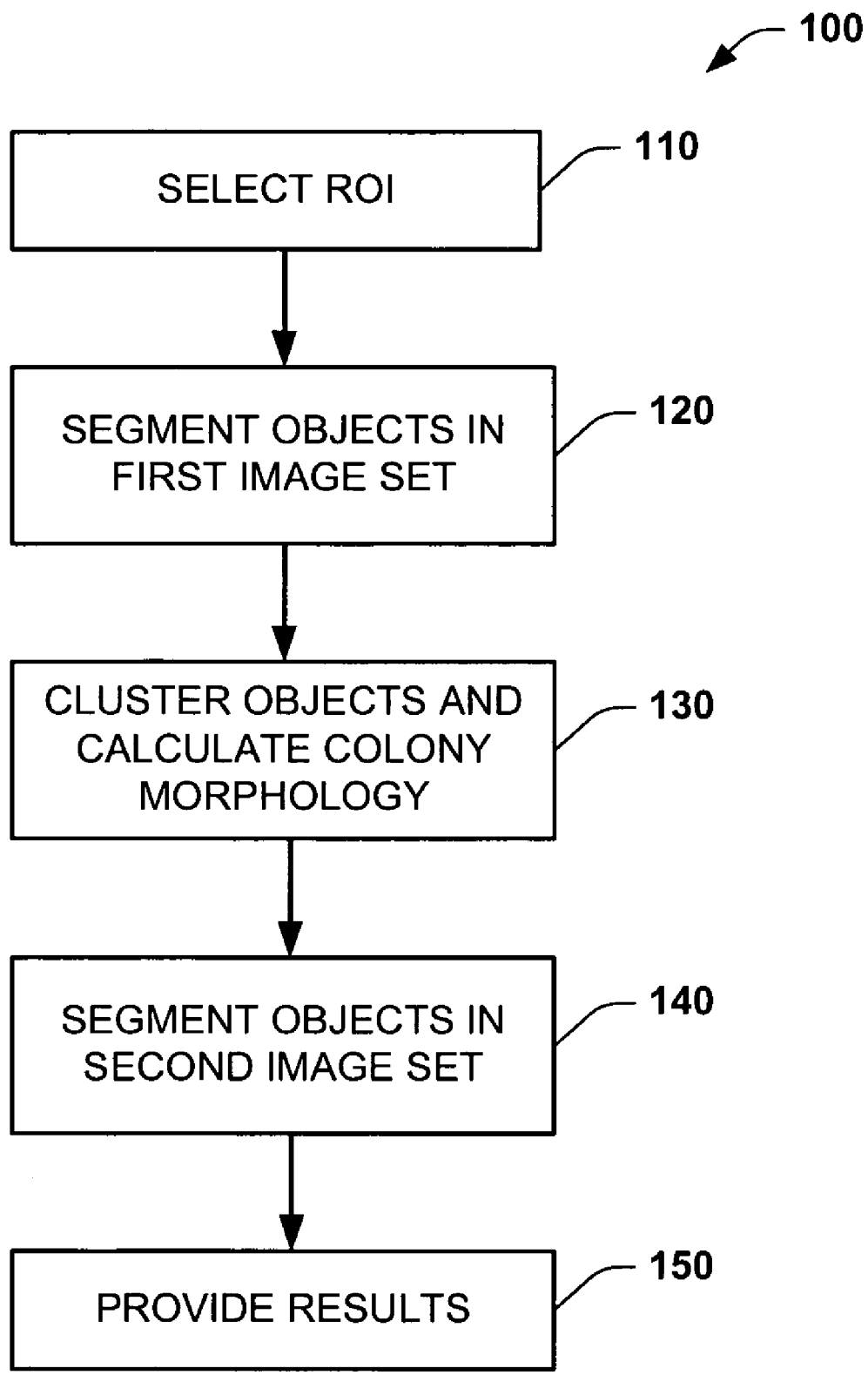
FIG. 4 is a flow diagram depicting a general algorithm that can be implemented to perform colony analysis in accordance with an aspect of the present invention.

The analysis system 14 is programmed to perform quantitative analysis of image data according to an aspect of the present invention. FIG. 4 depicts an overview of an automated image processing method 100 that can be performed by analysis system 14 for cell colony identification. For purposes of simplicity of explanation and not by way of limitation, the methodologies described herein will be explained in the context of cell colony identification for progenitor cells, such as colony forming units of progenitor cells for connective tissue (CTPs). Those skilled in the art will understand and appreciate that the methods and systems described herein are not limited to applications for progenitor cells. The method 100 of FIG. 4 assumes that the image data already has been assembled to provide a corresponding montage of background-corrected images.

Referring to FIG. 4, the method 100 includes selecting a region of interest (ROI), indicated at 110. The ROI can be selected (at 110) in the montaged background-corrected image. The ROI establishes boundaries of the given sample 18 to which subsequent analysis can be restricted. For instance, automated ROI selection can be performed as a function the percentage of segmented pixels (in each row and column) located within a predetermined number of pixels from the image edge. The pixels outside of the determined boundary can be set to zero. By defining the ROI in this or other manner, the amount of data in from the image set can be reduced so as to facilitate analysis. The ROI selection at 110 can be manual or automated, and further may further employ commercial or proprietary software. After the ROI has been selected, the analysis system can perform quantitative analysis. Those skilled in the art will appreciate various types of analysis that can be performed on the image data within the ROI based on the teachings contained herein, including but not limited to quantitative analysis of cell cultures.

At 120, objects in a first image set are segmented. As used herein, the term "segmentation" and variants of this term refer to the identification of objects above background noise using image-processing methods, such as described herein. Examples of segmentation that can be utilized include the application of image processing filters (or algorithms), such as one or more thresholds, region growing, by detecting either object boundaries (e.g., contour-orientated segmentation or whole objects (e.g., region-based segmentation). One particular example of a segmentation approach is described with respect to FIG. 5.

Continuing with the example of analyzing cell cultures, the segmentation can include segmenting nuclei or cells within the ROI in the montaged image set, such as the DAPI stained image set. The segmentation at 120 further can include cleaning of debris and other artifacts from the image set. The cleaning can include automated cleaning according to predetermined criteria. The cleaning can also include manual cleaning of objects, such as by selection of such objects via a corresponding user input device.

At 130, the method 100 includes clustering objects and calculating morphology of defined groups of objects. As used herein, "clustering" relates to grouping objects of interest into groups or clusters based on predefined criteria. The predefined criteria can include one or more of geographic proximity, density, similarity of color, shape or size to name a few. For example, identified groups of cell nuclei can be employed to cluster groups of cells into colonies of cells. The groups, such as progenitor cells, can be detected based upon the appearance of a colony of progeny that form around an original site of attachment. The number of colonies for a given sample can provide a measure of the colony forming units (CFUs) in the sample.

After the colonies have been identified, chemical and/or morphological characteristics of the colony can be determined as part of the clustering. Colony morphology, for example, can include a determination of the number cells, the size (area) of a colony, cell density within some or all colonies, cell distribution with a given colony, as well as a characterization of how well a colony (or cells within the colony) expresses a particular marker via staining (e.g., AP-positive staining density). The number of colonies in a given sample (e.g., a culture well) can also be ascertained as part of the clustering at 130.

At 140, objects in the second image set can be segmented and characterized. For example, the second image set can correspond to one or more AP-stained image that has been acquired for the same ROI and sample as the first image set (at 120). The characterization of the AP-stained images may include calculating a ratio of pixels for AP-stained images relative to the number of pixels from the first segmented image set (DAPI-stained pixels), which can be represented as a percent AP-positive density relative to DAPI pixels (e.g., 100.0*number segmented AP pixels/number DAPI colony pixels). Those skilled in the art will appreciate that other stains can be employed and additional image sets correlated to characterize colonies as a function of markers being expressed by cells in the respective colonies. The markers utilized can include morphologic markers, immunochemical markers, histochemical markers to name a few. Additionally, the characterization can include in-situ hybridization to assess specific gene expression in cells in the respective colonies. The markers further can be employed to quantitatively assess whether the cells might express particular proteins, such as markers designed to detect intracellular proteins, extracellular proteins and cell surface proteins. Various markers also exist to detect and ascertain the magnitude of gene expression as well as the number and structure of chromosomal features.

Markers can also be employed to identify chemical features or morphologic features in the matrix materials around and near the cells, which further can be used to characterize and assess biological identity or performance of the adjacent cells. For example, chemical features may include proteins or other chemical compounds that may be secreted or deposited by cells. Morphologic features near the cells can include supercellular features (e.g., collections of cells into geometric structures, such as tubular and rosette shapes), minerals (e.g., calcium-based compounds) formed near the cells, fibrous proteins formed near cells, as well as the size and configuration of junction points between cells to name a few.

At 150, results of the analysis are provided. The results can include graphics superimposed on the processed image, text, or a combination of graphics and text. The results can thus indicate a variety of information that quantitatively describes colony morphology or cell morphology, as described herein. Additionally, the automated method 100 tends to be less-biased for identifying characteristics of objects and groups of related objects, such as CFUs, than approaches that employ individual reviewers. The method 100 also can provide more quantitative morphological information (e.g., colony morphology) than can be obtained manually, and the automated method can be performed in significantly less time.

By way of example, the results provided at 150 can be employed in clinical and commercial settings to characterize populations of different tissues. The efficacy of different processing techniques for culturing cells under different conditions (e.g., temperature, pressure, light, catalysts etc.) can also be assessed by observing the quantitative results provided at 150. As one example, the method 100 can be employed to evaluate the responsiveness of a plurality of samples (e.g., cell cultures) to which different one or more chemicals, compounds, drugs or combinations thereof have been applied. For instance, the efficacy of chemicals, chemical compounds, drugs or combinations can be evaluated for use in developing improved strategies for cell growth or other treatment modalities. As another alternative, the method 100 can be used to compare and assess morphologic and other characteristics of different cell originating samples and their progeny, such as for use implementing quality control procedures.

Figure 5:
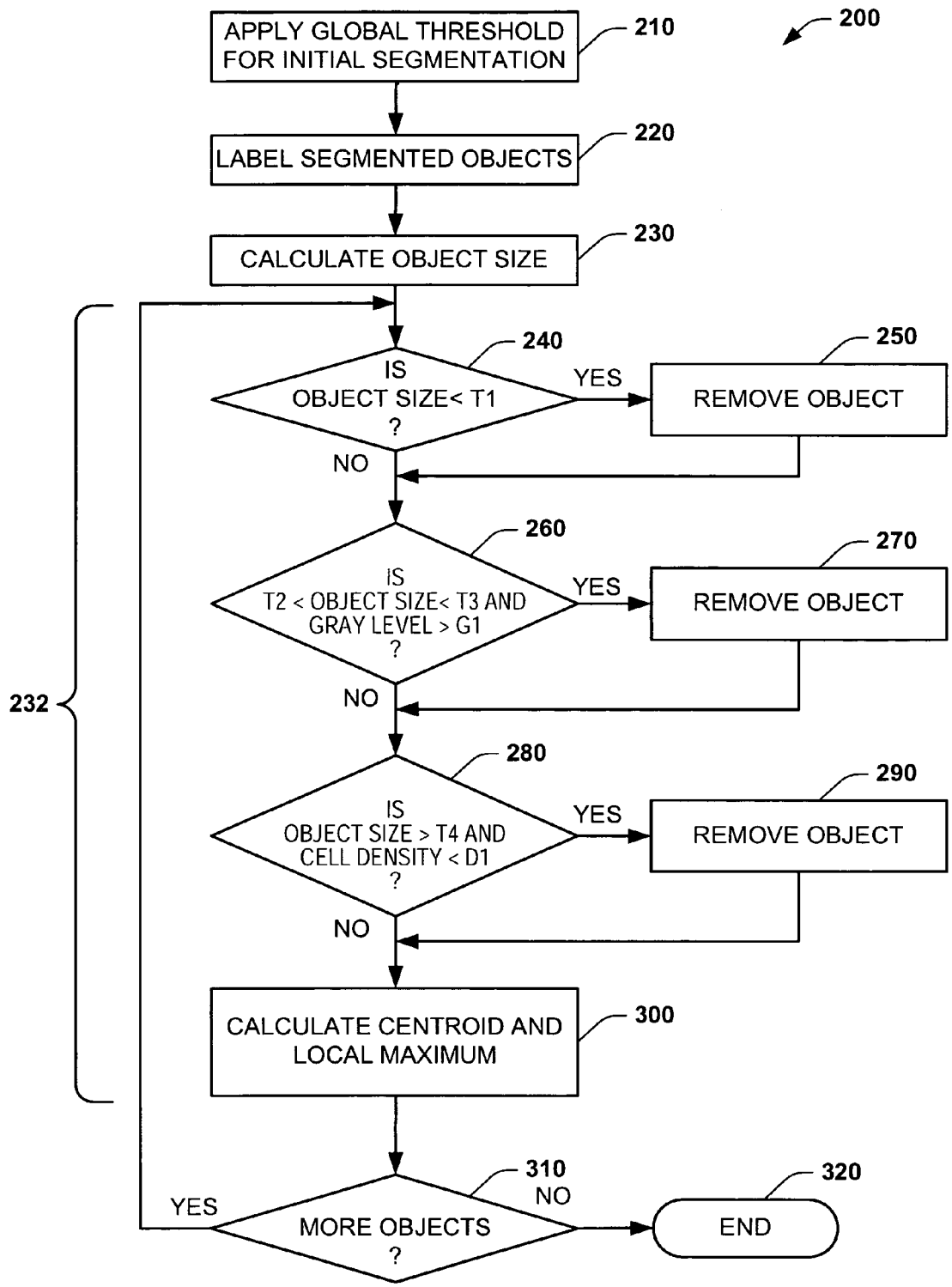
FIG. 5 is a flow diagram depicting an example of segmentation in accordance with an aspect of the present invention.

FIG. 5 depicts an example a method 200 that can be employed to segment objects from a background-corrected image, such as corresponding to image data for a montaged set of images. At 210, a global threshold is applied to the image data to segment objects from the background, such as within the ROI. As an example, objects that represent cell nuclei can be segmented from the background using a global threshold, such as corresponding to a gray level intensity threshold. The gray level threshold can be employed for selecting objects within range of intensity levels, such as determined based on intensity values just above the peak level in a distribution of the image data (e.g., from a histogram). At 220, the segmented objects can be labeled to identify the respective objects relative to the background. For instance, segmented objects within the image can be labeled using a connected-components labeling algorithm, such as is described in *Digital Image Processing*, by Gonzalez R C, and Woods R E, Addison-Wesley Publishing Company Reading Mass., 1992. The threshold can be fixed or it can be a user-selectable parameter that can be set according to application requirements.

At 230, the size (e.g., area of for two-dimensional objects) of each labeled object is calculated. Since additional objects, which may not correspond to cell nuclei or other objects of interest may also have been segmented and labeled according to the global threshold, a cleaning procedure 232 can be implemented on the labeled objects. The cleaning procedure 232 can be implemented based on a priori information about the objects represented in the image data, such as may include one or more of the following object criteria: size of object, gray level intensity of object, and number of surrounding objects or local object density. The cleaning procedure can be fully or partially automated. For instance, an object that meet object criteria designed for removing the object can be either automatically removed or, alternatively, a user can be prompted (e.g., by a graphical user interface (GUI)) to remove or keep the object. Additionally, a user can manually implement cleaning of objects, such as by selection of such objects via a corresponding user input device.

In the example of FIG. 5, the cleaning procedure 232 includes a determination at 240 as to whether the object size is less than a first size threshold T1. If the object size is less than T1 (YES), the method proceeds to 250 in which the object is removed from the image, such as by setting their pixel values to zero, setting the objects to correspond to the background or otherwise flagging pixels to be ignored. The threshold T1 can be set to value (e.g., T1=152 $\mu m^2$) such that all objects that are less than this size are removed from the image designed to eliminate small objects most likely represented something other than cell nuclei, such as apoptotic cells, cell fragments, or residual stain. From 250 or if the object size is not less than T1, the method proceeds to 260.

Figure 6A:
FIG. 6A depicts an example of a first type of debris or an artifact that can be removed from an image during segmentation in accordance with an aspect of the present invention.

At 260, a determination is made as to whether the object size is between size thresholds T2 and T3 and whether the gray level of the object is greater than a predetermined intensity level G1. If the conditions at 260 are met, the method proceeds to 270 in which the object is removed. The size thresholds can be set to identify lint or other debris, such as shown in FIG. 6A. For example, the size thresholds T2 and T3 may fall within a range between about 5,069 $\mu m^2$ and about 15,842 $\mu m^2$ in size. The intensity level G1 (e.g., greater than 180 gray level intensity) can be employed in combination with the size range to identify objects (other than cells) that tend to auto-fluoresce at high signal intensity. From 270 or if the object does not meet the object conditions defined at 260, the method proceeds to 280.

Figure 6B:
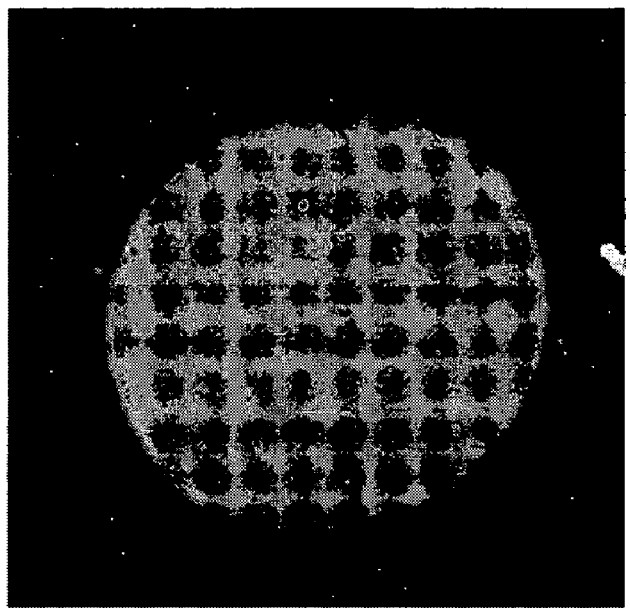
FIG. 6B depicts an example of a second type of debris or artifact that can be removed from an image during segmentation in accordance with an aspect of the present invention.

At 280, a determination is made as to whether the image size is greater than a fourth size threshold T4 and whether the density of the objects is less than a predetermined density D1. If the conditions at 280 are met, the method proceeds to 290 and the object is removed. The size threshold T4 and density D1 can be programmed to remove image data, for example, corresponding to a spherical aberration in the glass slide, such as is depicted in FIG. 6B, as opposed to tightly clustered nuclei in the center of a large colony. As an example, the size threshold T4 can be set to an area of about 31,675 $\mu m^2$ and a local density of the objects can be evaluated by counting the objects within a predetermined surrounding radial region (e.g., within a distance about 178 µm from the object). If the percentage of objects within the surrounding region is less than D1 (e.g., approximately 10%) then the object was most likely due some aberration or distortion. From 290 or if the object does not meet the object conditions defined at 280, the cleaning procedure 232 ends and the method proceeds to 300. Thus, if the object remains after the cleaning procedure 232, then the object can be considered a cell nucleus.

At 300, the centroid and local maximum intensity can be calculated for the object. For instance, the local maximum intensity for a given set of pixels (e.g., within a 7×7 pixel square window) of the segmented object can be calculated. The local maximum intensity (or intensities) for a given object, for example, represents an individual cell nuclei in cases where multiple cell nuclei may have been segmented as one individual object. Thus, the local intensities can be employed to provide a more accurate cell nuclei count than upon visual inspection of the image.

From 300, the method proceeds to 310 in which a determination is made as to whether additional labeled and segmented objects are to be cleaned according the cleaning process 232. If more objects exist (YES), the method 200 returns to 240 to repeat the cleaning process 232 for a next object. After all objects have been segmented and cleaned, the method ends at 320. It is to be understood that the calculations at 300 can be performed each iteration for a given object or it can be performed as a batch process for each of the objects in the image after cleaning procedure has been implemented on the entire set of objects.

Additionally, while the method 200 has been described as being performed once for a given object, it is to be understood that, in certain embodiments, more than one iteration of the method or a similar method can be performed on a given object, such as according to different criteria or using different threshold levels. When multiple iterations are performed, the results can be aggregated to implement segmentation of the given object.

Figure 7:
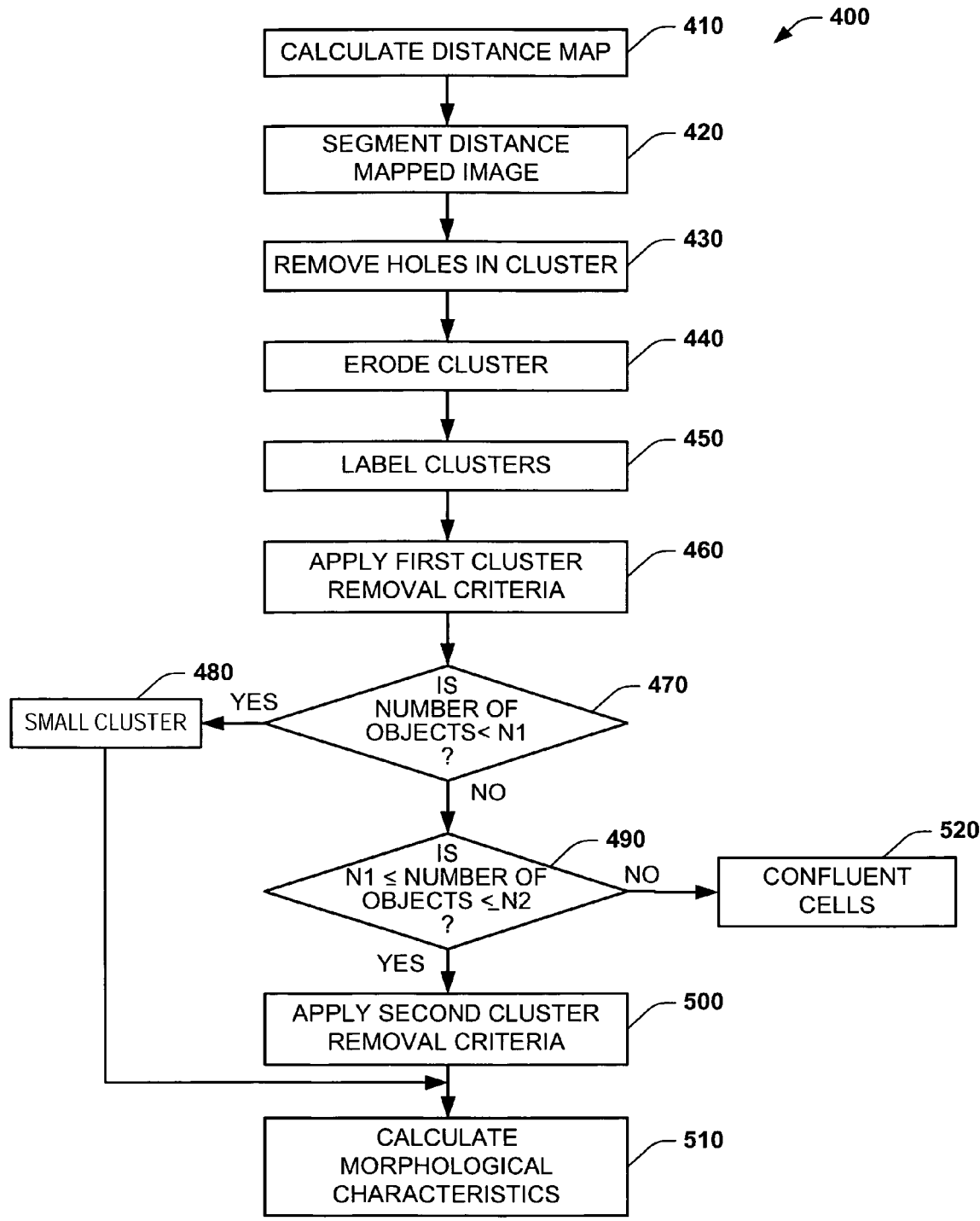
FIG. 7 is a flow diagram depicting an example of clustering that may be performed to cluster cell nuclei in accordance with an aspect of the present invention.

FIG. 7 depicts an example of a method 400 that can be performed for clustering the objects in the image. The method 400 can be employed for determining morphology of the segmented objects, such as after performing the method 200 of FIG. 5. The method begins at 410 by computing a corresponding distance map from a cleaned, segmented image. A distance map is an image where the value of each pixel is the distance from this pixel to the nearest pixel belonging to a given set or object. As one example, the clustering performed at 410 can employ a distance measuring metric, such as may be implemented by segmenting a Euclidian Distance Map (EDM) image of the background. An example of a process for generating an EDM is described in "*Euclidean Distance Mapping. Computer Graphics and Image Processing*," by Danielsson P. E., 14:227-248, 1980. Those skilled in the art will understand and appreciate that various different distance transformation algorithms can be employed to generate the distance map at 410, all of which are contemplated as falling within the scope of the present invention. For simplicity of explanation and not by way of limitation, the following description may be described in the context of using an EDM image.

At 420, the distance map image is segmented. The segmentation can be applied by employing a gray level threshold to the distance map image, such as the EDM image. For instance, the gray levels within an EDM image of the background correspond to the minimum half-distance between segmented objects in the image. The segmentation for the pixels of the EDM image between 0-20 gray levels will result in clustering of objects that are within a predetermined number of pixels of one another, such as about 40 pixels or 142.4 µm (for a pixel width=3.56 µm).

At 430, holes in the resulting cluster are removed. As an example, small 'holes' within the clusters can be filled in using a 7×7 pixel square morphological binary erosion operation on the distance map image. At 440, the outer boundary of each cluster can then be eroded a distance equal to the distance that is used to cluster the objects originally in order to provide an accurate boundary of the cluster, such as by eroding the image back to (or near) its original size.

At 450, the resulting clusters are labeled. Additionally, at 460, first cluster removal criteria can be applied to the image for removing certain clusters. For example, the criteria applied at 460 can be programmed to remove clusters having less than a predetermined number of nuclei (e.g., eight cell nuclei), such as can be identified using the local maximal intensity for the clusters. Additionally or alternatively, the first criteria can be programmed to remove clusters having less than a predetermined number of objects (e.g., 3 separate objects) based on the number of centroids within each cluster. The cluster removal at 460 can be automatically applied to remove such clusters from further analysis in the method 400.

The remaining clustering analysis and evaluation of the remaining clusters in the image can vary based on the number of objects (e.g., nuclei) within each cluster, which corresponds to a ROI. One reason for performing analysis on the clusters in this manner (e.g., different analysis according to the number of nuclei) is because cell colonies have different characteristics at different nuclear densities. Accordingly, different criteria may be required for eliminating clusters of objects that might represent debris as opposed to actual cell colonies, which can vary as a function of nuclear density in a given cluster. Thus, the remaining clusters in the image can be separated into different categories so that different evaluation and analysis can be applied based the nuclear density of each given cluster.

At 470, a determination is made as to whether the number of objects in a given cluster is less than a first threshold number N1. The threshold number N1, for example, can be set to a value identified to establish a first category of cluster (e.g., clusters having less than 2500 cell nuclei). If the number of objects is less than N1 (YES), the method proceeds to 480, in which the cluster is identified as a small cluster. A small cluster corresponds to a category of cluster in which no additional criteria for removing clusters is applied. Typically, the cell colonies within this category are relative small and compact such that further criteria for removing debris is not easily applied. If the number of objects is not less than N1 (NO), the method proceeds to 490.

Figure 8:
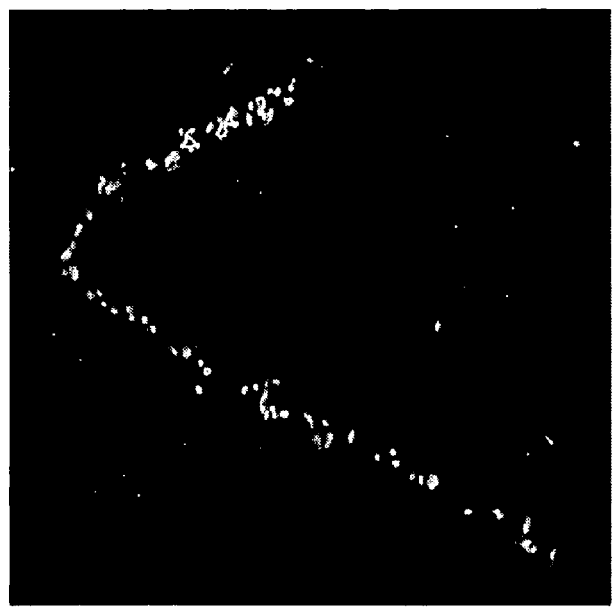
FIG. 8 depicts an example of debris or an artifact that can be removed from an image during clustering in accordance with an aspect of the present invention.

At 490, a determination is made as to whether the number of objects is greater than or equal to N1 and less than or equal to N2. This determination (at 490) is applied to establish a second category of clusters to which additional cluster removal criteria can be applied. Thus, if the conditions of 490 are met (YES), the method proceeds to 500. At 500, second cluster removal criteria is applied. The second cluster removal criteria, for example, can assess the width of clusters, boundary length of clusters, cell density of the clusters as well as combinations thereof. By way of example, the second cluster removal criteria can include computing whether an average width of a given cluster is less than a predetermined measurement value (e.g., about 42.7 µm), such as corresponding to a small single line of cells or debris. The criteria at 500 can also determine whether the cluster an average width greater than a first predetermined measurement value (e.g., about 42.7 µm) and less than a second predetermined measurement value (e.g., 106.8 µm) and has a maximal boundary length greater than a predetermined length (e.g., about 356 µm). A given cluster can be removed based on whether such criteria are met. The criteria further can be applied to remove clusters based on a ratio of the maximal boundary length to average width, such as greater than about 20. The additional criteria applied at 500, for example, can be used to identify artificially developed cluster of cells that form in or near narrow scratches in the surface of the cell culture, such as shown in FIG. 8.

Another cluster removal criteria that can be applied at 500 includes determining whether the number of cell nuclei less than a predetermined number (e.g., sixteen) and that percent cell density (i.e., 100.0*number cell nuclei/area of cluster) less than 0.75%, such as may identify small loose colonies. A given cluster can be removed based on whether such criteria are met.

At 510, morphological characteristics for the remaining clusters are calculated. Each remaining cluster at this phase can correspond to a colony of cells having various characteristics determined from the methods 200 and 400. These characteristics can be evaluated to ascertain, for example, proliferation of colonies, migration of colonies, and differentiation of the various colonies. While the foregoing example has been described as characterizing morphology of a given colony, the characterization can also be applied to individual cells to characterize internal attributes and features of respective cells.

If the if the conditions of 490 are not met, such as having greater than N2 cell nuclei (YES), the method proceeds to 520. At 520, the no further processing is performed relative to such cluster. For example, these clusters either contain a confluent layer of cells that cannot be easily clustered or are full of debris that interferes with the automated clustering algorithm.

Once a cluster has been identified, morphological characteristics of each of the respective clusters or colonies can be extracted. For example, the distribution of objects in an identified colony can be parameterized, such as by providing a distribution of objects in a colony relative to the centroid of the colony. The relative spatial distribution of the objects in a colony can be utilized in evaluation by a user. Other morphological characteristics that can be extracted from respective colonies, including the size of the respective nuclei or variation in nuclear size within a given cluster. Different cluster sizes can also be analyzed as well as the particular morphological characteristics between the respective clusters. Those skilled in the art will understand and appreciate other features and characteristics that can be extracted from the images for evaluation.

Figure 9A:
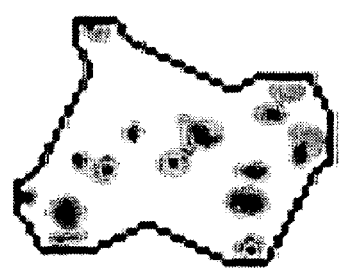
FIG. 9A depicts an example of a first colony identified in accordance with an aspect of the present invention.
Figure 9B:
FIG. 9B depicts an example of a second colony identified in accordance with an aspect of the present invention.
Figure 9C:
FIG. 9C depicts an example of a third colony identified in accordance with an aspect of the present invention.

FIGS. 9A, 9B and 9C depict examples of automatically identified colonies, such as according to the clustering method 500. FIG. 9A depicts an example of a small tightly-clustered colony, such as may be identified at 480 in FIG. 7. FIG. 9B depicts an example of an image of a medium low-density colony, and FIG. 9C depicts an example of a large high-density colony. An example of sample colony morphology statistics, such as have been produced by automated analysis for ten different patients e.g., according to the methods 100, 200 and 500 of FIGS. 4, 5 and 7, respectively) are summarized in Table 1.

TABLE 1

| Patient Number | Total Number Colonies | Number Cells | Size Colony (mm$^2$) | Cell Density (%) | AP Density (%) |
|---|---|---|---|---|---|
| 1 | 40 | 70 (19) | 0.207 (0.050) | 0.46 (0.03) | 1.54 (0.49) |
| 2 | 59 | 47 (8) | 0.188 (0.031) | 0.42 (0.03) | 3.97 (1.04) |
| 3 | 79 | 17 (1) | 0.046 (0.006) | 0.60 (0.03) | 2.24 (0.85) |
| 4 | 32 | 16 (2) | 0.049 (0.008) | 0.51 (0.04) | 3.37 (0.92) |
| 5 | 127 | 372 (117) | 1.700 (0.506) | 0.32 (0.02) | 1.91 (0.40) |
| 6 | 9 | 20 (3) | 0.049 (0.009) | 0.61 (0.07) | 25.0 (10.3) |
| 7 | 23 | 163 (55) | 0.411 (0.113) | 0.47 (0.04) | 7.76 (2.69) |
| 8 | 58 | 47 (15) | 0.150 (0.050) | 0.55 (0.04) | 5.01 (1.74) |
| 9 | 30 | 35 (8) | 0.180 (0.051) | 0.39 (0.03) | 0.13 (0.04) |
| 10 | 155 | 187 (44) | 0.634 (0.117) | 0.32 (0.01) | 0.28 (0.09) |

From the examples represented in Table 1, it can be shown that the total number of colonies identified per patient ranged from 9 to 155 with a mean of 61 (standard deviation=47) and a median of 49. The mean number of cell nuclei per colony ranged from 16 to 372 with a mean of 97 (standard deviation=114) and median of 47. The mean size of the colony ranged from 0.046 to 1.7 mm$^2$ with a mean size of 0.361 (standard deviation=0.506) and median of 0.184. The mean percent cell density per colony ranged from 0.32 to 0.61 with a mean percent density of 0.47 (standard deviation=0.09) and a median value of 0.47%. The mean percent AP-positive stained density per colony ranged from 0.13 to 25% with a mean value of 5.12 (standard deviation=7.33) and median of 2.81.

Figure 10:
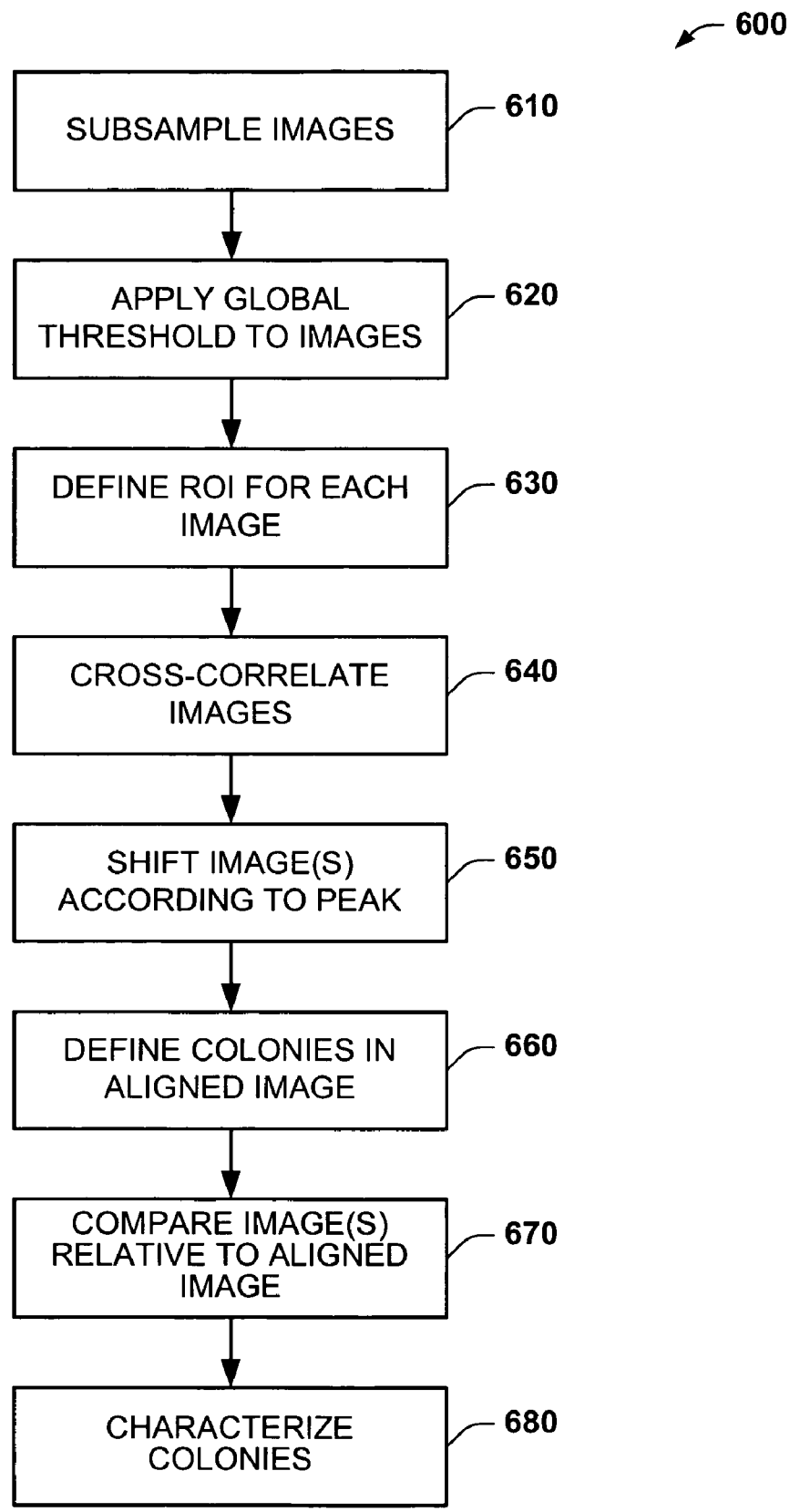
FIG. 10 is a flow diagram depicting an example of an image alignment process that can be implemented in accordance with an aspect of the present invention.

FIG. 10 is a flow diagram depicting an example of an automated alignment method 600 that can be employed to help characterize features and properties of objects in a given sample. The method 600, for example, can be implemented as computer-executable instructions running on the analysis system 14 (FIG. 3) or on another processor-based device, such as a computer.

The method 600 begins at 610 by sampling each of two or more images. The sampling can include subsampling (e.g., subsampling by four) to reduce the amount of image data and facilitate the alignment method. The images can correspond to different image sets of the same sample that have been acquired under different conditions, such as by employing different markers or stains, using different wavelengths of light, using different filters or any combination thereof. As an example, a first image set can be acquired for a given sample that has been stained with a marker (e.g., DAPI) known to be capable of distinguishing a particular type of object (e.g., cells), such as can be used to identify cell locations. A second image can be acquired for a given sample that has been stained with a different marker (e.g., AP) known to distinguish one or more different components or parts of the objects, such as can be utilized to provide information about cell performance characteristics (e.g., cell morphology, proliferation of cells, differentiation of progenitor cells etc.).

At 620, a global threshold is applied to each of the images, such as to segment the subsampled image relative to the image background. At 630, a ROI is defined for each of the segmented images. For example, the ROI can be defined by ascertaining a percentage of pixels in the segmented image, such as for each row and column. If the percentage of segmented pixels within a given row or column exceeds a corresponding threshold percentage (e.g., approximately 20%), the row or column can be set as an inner boundary. The most inner row and most inner column within a predetermined distance (e.g., about 100-400 pixels) of the image edge can then be set as the inner boundary. Pixels outside of the inner boundary can be set to zero or otherwise removed from the segmented image, such that the ROI is defined as the portion of the image within the inner boundaries. The ROI can be rectangular as well as other shapes. Additionally, the ROI can include a set of contiguous pixels or, alternatively, multiple ROIs (e.g., one ROI for each group of related objects, such as a colony) can be defined in each of the images.

At 640, the segmented images in the ROI are cross-correlated. Such cross-correlation can include registering or overlapping multiple segmented images to produce a statistical description based on mutual or reciprocal relationships in the respective images. The cross-correlation can be performed in the spatial or frequency domain by aggregating the segmented images. The cross-correlation determines a correlation value by overlapping the respective segmented images for the ROI and aggregating the values (e.g., pixel intensity) of the overlapping pixels. For instance, the aggregating of pixel values can be implemented by summing values in the spatial domain or multiplying values in the frequency domain.

The cross-correlation can be performed on metrics that are unique to each image (e.g., when different stained images). For example, one segmented image can be clustered to identify colonies (e.g., of cells) and one or more other images can be registered into the coordinate space of the clustered image to ascertain one or more characteristics of each of the clusters. As described herein, the characteristics can include morphologic characteristic of at least one of the cells and the groups or colonies, immunochemical characteristic of the cells, histochemical characteristic of the cells, and characteristics revealed by in situ hybridization of the cells. Alternatively, the cross-correlation can be employed relative to two different segmented and clustered images of the same sample as a means to validate the identification of colonies in the sample.

At 650, the respective images can be incrementally shifted relative to each other in one or more directions and correlation values determined until a peak or maximum correlation value is achieved. A maximum or peak correlation value indicates an optimum level of alignment between the respective images. Other techniques (e.g., warping) can be applied to improve alignment between the images. Once aligned, an aggregate image of the aligned images can be stored in memory for subsequent analysis.

At 660, colonies or groups of objects within the aligned image are defined. That is, the groups of objects in the aligned image correspond to those groups that exist in both images, such as according to clustering applied to the respective separate images. Additionally or alternatively, clustering can be applied to the aligned image, such described herein (e.g., FIG. 5). At 670, one or more of the images can be compared relative to the aligned image. The comparison can be performed to determine whether any colonies exist in the one or more separate images but not in the aligned image or if a colony exists in the aligned image but not in the separate image(s). The results of the comparison can be utilized to revise the clustering procedure, such as by adjusting clustering criteria and/or thresholds (see, e.g., FIG. 5). By revising the clustering procedure, for example, clusters that may have been removed or not identified as clusters for one or more of the images can be identified and labeled appropriately for improved analysis.

At 680, the colonies can be characterized. The characterization can include a variety of features and properties of the colonies as well as features and properties of the objects within each of the colonies, such as describe herein.

The analysis engine can further be employed to locate a particular object as well as a group or colony of objects (e.g., cells) and provide corresponding identifying data that defines the location (e.g., in two-dimensional space) of the localized object(s) that exhibit a predefined selection criteria. The selection criteria, for example, can include one or more morphologic features as well as be based on marker criteria utilized to differentiate structure and/or chemical features, such as described herein. The identifying data can further be employed by an automated or manual method for collection of the object(s), such as cells and/or other material, from the identified location. For example, a collection system can include a robot programmed to collect the sample (e.g., via suction means) based on the identifying data. Cells and other materials collected from the identified location can be submitted to secondary biochemical or molecular analysis, thereby allowing further characterization of the object (e.g., a group, cell or colony of interest). Additionally, one or more viable cells collected from the location can be further expanded in culture to establish a purified population of cells derived only from the identified object, group, cell or colony of interest. Thus, the imaging process can be repeatedly applied to sequential (or non-sequential) generations of cells. As a result, one or more viable cell can be manipulated and/or delivered to a patient with therapeutic intent.

As another example, the image processing techniques can also be utilized to isolate viable cells lines based on chemical and/or morphological features extracted from image analysis implemented according to an aspect of the present invention. For instance, the feature extraction can be employed to discriminate between colonies to identify a desired colony of cells exhibiting desirable characteristics. After a group of cells have been identified, the viable cells can be isolated relative to the remaining undesirable cells. For example, the spatial coordinates of the desired cells can be utilized to remove the cells. Alternatively, the coordinates can be employed to isolate and to protect the desired cells while the other undesirable cells are ablated or otherwise removed from the sample space. Those skilled in the art will understand and appreciate various robotic and manual techniques that can be employed to isolate and remove cells after they have been located based on the teachings contained herein.

Figure 11:
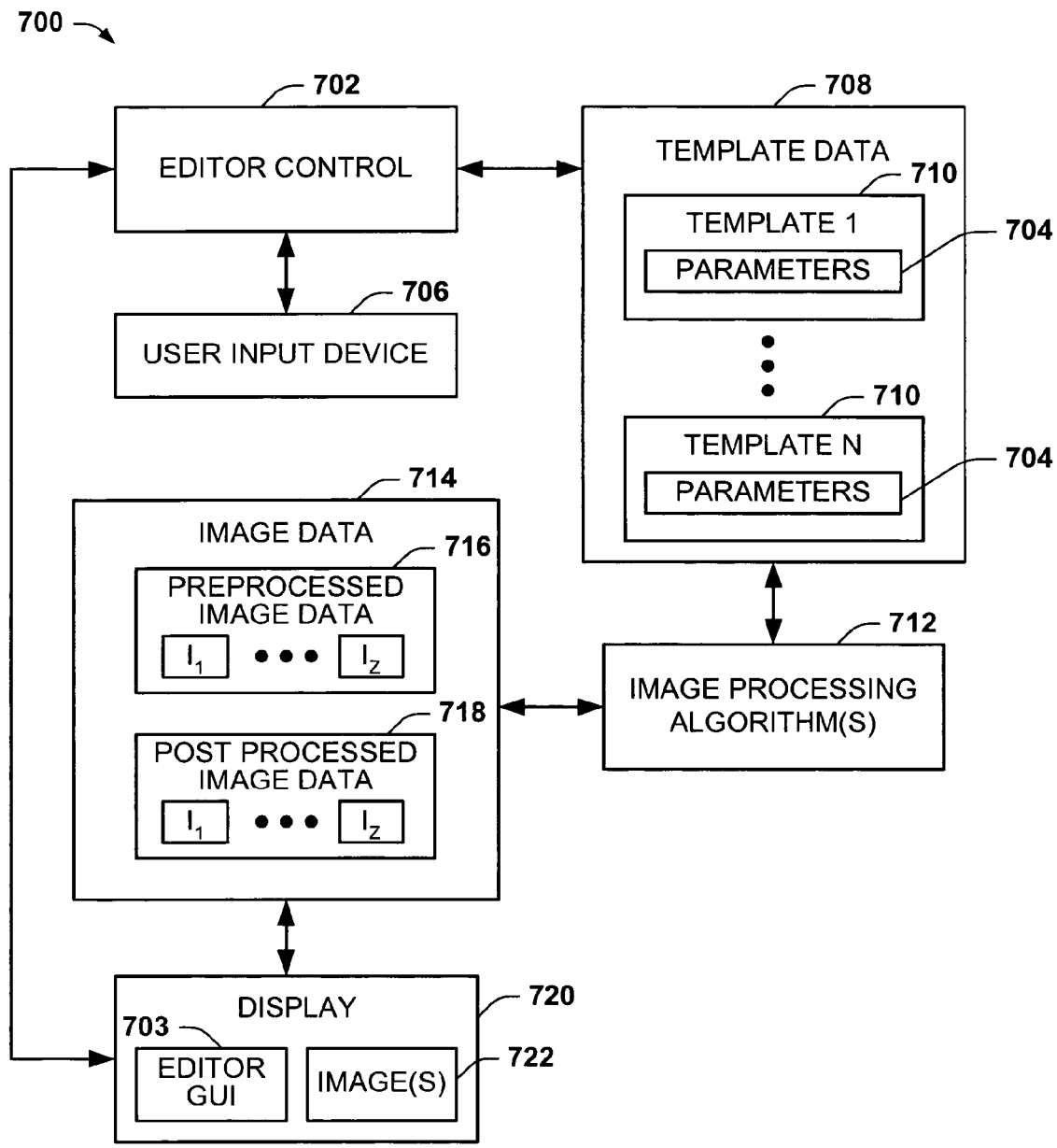
FIG. 11 depicts an example of an editing system for adjusting image processing parameters according to an aspect of the present invention.

FIG. 11 depicts an example of a system 700 that can be utilized to adjust image processing parameters. The system 700 includes an editor control 702 through which a user can set or adjust one or more parameters 704 associated with the analysis or display of image objects. For example, the editor control 702 can provide a graphical user interface (GUI) 703 on an associated display 720. The user can access the editor 702 via a user input device 706 that is configured to manipulate the GUI 703. The GUI 703 can be programmed to present and modify graphical and/or textual elements on the display 720 based on instructions input by the user input device. Selected graphical and/or textual elements of the GUI 703 can map to respective parameters 704 to enable the user to set the parameters. The user input device 706 can include a pointing device (e.g., a mouse or touch screen), a keyboard, on screen display or other device coupled to the analysis system via a corresponding interface, which may be wired or wireless.

Thus, a user can employ the user input device to set or modify one or more values of the parameters 704 associated with the image analysis process.

As described herein, the image analysis process can include a segmentation stage, a clustering stage, a correlation stage and a review stage. The parameters 704 can include values that define parameterization for a given stage or for the entire image processing algorithm 712 that is employed to analyze a set of input images. The editor control 702 can set parameters associated with each stage individually, or the editor control can set of parameters for the entire image analysis process.

As an example, the parameters 704 can be stored as template data 708 that defines parameterization for the image analysis process. There can be any number of one or more templates 710, indicated in FIG. 11 as TEMPLATE 1 through TEMPLATE N, where N is a positive integer greater than or equal to 1. Each template 710 can include a single set of parameters encapsulating the parameterization of the entire processing protocol required for any given sample or set of images. New templates can be created and added to the system 700, via the GUI 703 and editor control 702, to incorporate new processing algorithms (e.g., at one or more image processing stages) or to process new types of data.

One of the templates, for example, may define a set of default parameters associated with a given type of analysis being performed, the type and content of the image data 714, and based on the equipment being utilized to perform such analysis and image acquisition. Depending on application requirements, a different one of the templates 710 can be selected or the parameters associated with a given one of the templates 710 can be modified to create a corresponding new template. For instance, the editor control 702 and associated GUI 703 can be utilized as part of an algorithm training sequence to establish a template that is tuned for a given set of circumstances. Each of the templates enables a user or group of users, which may be co-located or working in remote locations, to employ the same set of image processing parameters so as to maintain consistent processing conditions.

The image processing algorithm 712 employs selected parameters 704 associated with each stage to perform corresponding processing of image data 714. The processed image data 714 as well as pre-processed image data can be provided to the display 720 as corresponding images 722. The image data 714 can include pre-processed image data (e.g., raw or pre-processed image data) 716. The pre-processed image data 716 can include any number of one or more sets of images that are to be processed based on the teachings contained herein. The pre-processed image data 716, for example, can represent a set of images acquired for one or more samples. For instance, image data can be associated with each of a plurality of different image data sets, indicated at $I_1$ to $I_Z$, where Z is a positive integer denoting the number of image sets acquired. The pre-processed image data 716 may include some filtering and background correction to provide a partially processed image such as corresponding to a montage image acquired by the user or another individual.

Each of the Z image data sets can represent different images for the same sample or they may represent images of different samples. The image processing algorithm 712 thus can perform image analysis on the pre-processed image data 716 to provide corresponding post processed image data 718 for each of the respective images $I_1$ through $I_Z$. It is to be understood that the image data 714 can include image data for more than two stages of processing.

As used herein, the post processed image data 718 can include a set of the Z images for an intermediate step or stage of image processing or the post process image data 718 can represent the images after processing has been completed according to the teachings contained herein. The particular stage and extent of image processing performed by the image processing algorithms 712 can be selectively controlled by the user via the editor control 702. For example, a user can adjust a subset of the parameters 704 associated with a particular stage of image processing and thereby obtain post processed image data 718 that can be provided as one or more images 722 to the display 720 for such image processing stage. In this way, corresponding images or samples thereof 722 can be displayed to the user according to the post processed image data 718, which image data varies according to the parameterization of the image processing algorithm 712 that is applied.

As one example, a user can employ the editor control 702 to adjust one or more parameters associated with segmentation performed on the pre-processed image data 716. For instance, the user can enter a value for a threshold parameter that is to be applied to the pre-processed image data 716 to implement corresponding segmentation. The threshold value can be implemented as an intensity value based on which segmentation is performed. Those skilled in the art will understand and appreciate that one or more other types of segmentation can be implemented on the image data 716, such as including edge detection, feature analysis, gradient analysis, frequency domain analysis, which may have one or more user-selectable parameters.

As another example, the user can adjust one or more parameters associated with a clustering stage of the image processing algorithm 712. For instance, the user can employ the user input device 706 to adjust or set one or more parameters associated with clustering. For example, clustering algorithm can employ a distance parameter (e.g. Euclidian distance) that is utilized to determine whether a pixel or set of pixels are to be included in a given cluster of image objects. Those skilled in the art will understand and appreciate various other types of parameters that can be adjusted or set via the editor control 702 based on the teachings contained herein.

The parameterization can include which algorithms are used at each processing step, and what parameter values are used to tune each algorithm (or processing stage) for desired behavior. When a plurality of image sets (for the same or different samples) are being analyzed, such parameterization can be facilitated by displaying the impact of changes in parameterization for a plurality of concurrently displayed images.

Figure 12:
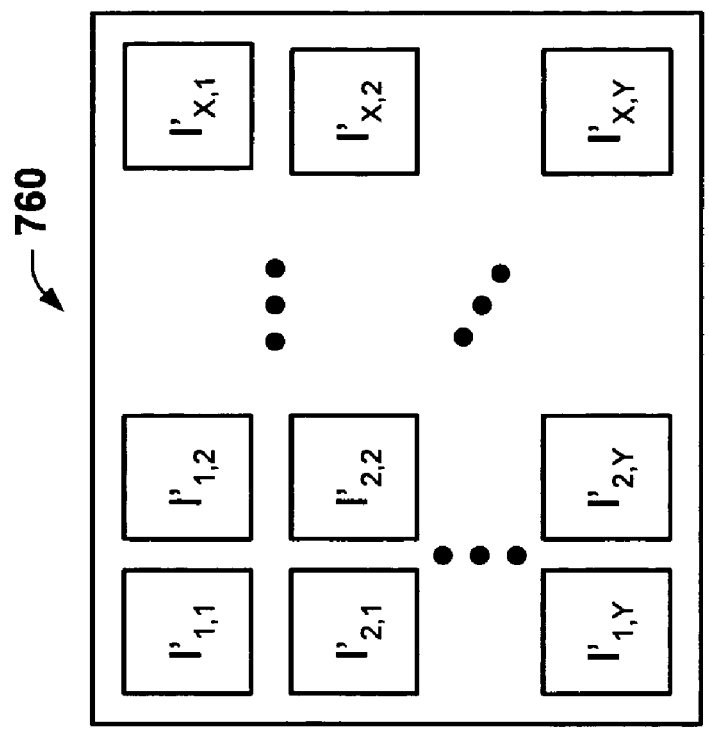
FIG. 12. depicts a schematic example of a plurality of images displayed based on image processing performed for different sets of parameters.
Figure 12:
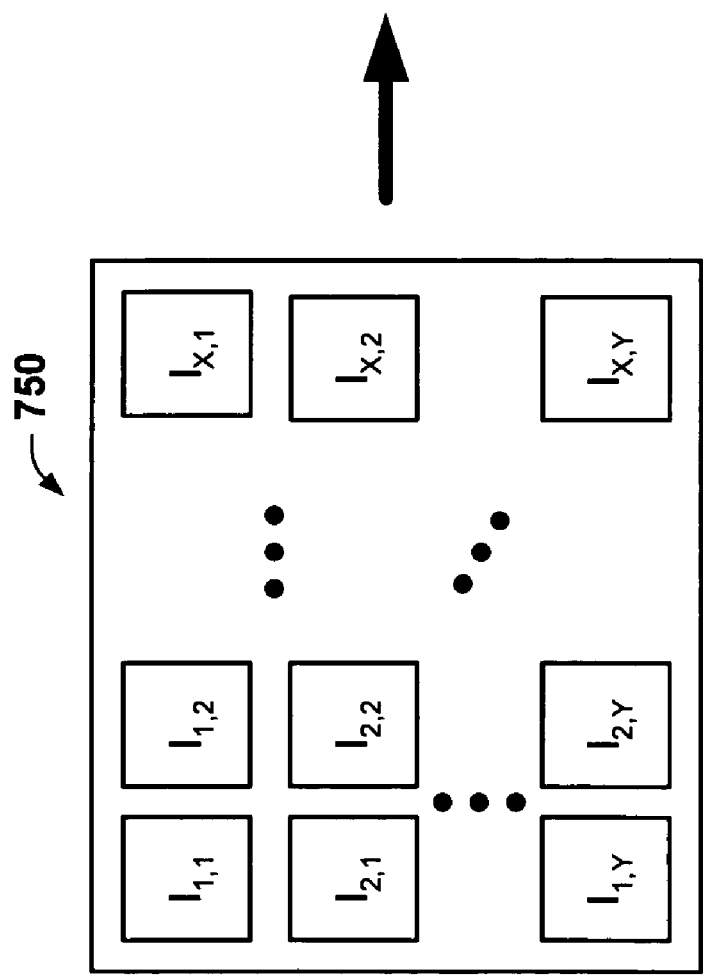

FIG. 12 depicts an image display 750 that includes a plurality of images arranged in a grid or matrix. Also shown is an image display 760 that includes the same plurality of images but having been processed differently, such as by using a different parameterization. In the example of FIG. 12 the images are arranged in a grid or matrix having X columns and Y rows (e.g., corresponding to an X by Y matrix of images). FIG. 12 will be described with reference to the system 700 of FIG. 11. For example, there are Z images in the X by Y matrix represented in each image display 750 and 760.

Each of the image displays 750 and 760 can be provided to a display as an image set, such as based on image data 716 and 718, respectively, shown and described with respect to FIG. 11. The images in the display 750, for example, correspond to either pre-processed images or images processed based on a first set of one or more parameters (e.g., defining a template 710).

As mentioned above, one or more parameters associated with a given stage of the image processing algorithm 712 can be adjusted by the editor control 702. Alternatively, a set of parameters that parameterize the entire process implemented by the algorithms 712 can be adjusted via the editor control 702. After one or more parameters has been adjusted via the editor control 702, the image processing algorithms 712 can be activated to perform corresponding processing of the image data 714 to provide corresponding post process image data 718 that can be utilized to provide a revised set of images on the display, indicated at 760. In the example of FIG. 12, the revised set of images are denoted by a prime symbol (').

By way of further example, a user can perceive changes in the displayed images 760 in response to modifying one or more parameters via the editor control 702. If the displayed images 760 improve in response to change in the parameterization (relative to the displayed images 750 prior to the change in parameterization), the revised set of parameter values can be saved as a corresponding template 710 for subsequent processing. Additional tuning of parameters can be performed via the editor control 702 until desired results are achieved for a given set of circumstances.

The images in the respective displays 750 and 760 can be displayed concurrently to the user to provide a side-by-side comparison. Alternatively, the image displays can be provided in separately. The respective images in each of the image matrices 750 and 760 can correspond to a low resolution version of a plurality of higher resolution images, such as high resolution montaged images described herein. Alternatively, the respective images in the image matrices 750 and 760 can represent a sampled region or subset (e.g., either at full resolution or a lower resolution) of the plurality of images. If the matrices 750 and 760 are constructed from sampled regions of corresponding images, the user can select (e.g., by the editor control 702 or other GUI) a given sample from each of the images or automatic means can be utilized to select the respective samples from each of the corresponding montage images.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, the approach described herein is applicable to analyzing characteristics of any type of objects that can be imaged, such as cells, tissue, microorganisms, viruses, as well as inorganic compounds and structures. Accordingly, the present invention is intended to embrace all such alterations, modifications, and variations that fall within the spirit and scope of the appended claims.

What is claimed is:

1. A computer-implemented method for analyzing an image, comprising:
   quantitatively analyzing image data to identify image objects relative to a background portion of the image according to predefined object criteria, the image data including a plurality of image objects that represent objects in a sample;
   clustering the identified image objects into groups or colonies of the identified image objects according to predefined clustering criteria;
   wherein the quantitatively analyzing further comprises segmenting image objects relative to the background portion of the image and to provide a segmented image; and
   wherein the predefined object criteria comprises at least one user-adjustable threshold set according to the type of objects being clustered into the groups or colonies.

2. The computer-implemented method of claim 1, wherein the quantitatively analyzing further comprises segmenting image objects relative to the background portion of the image and to provide a segmented image.

3. The computer-implemented method of claim 2, wherein the segmenting further comprises applying a global threshold to segment image objects relative to the background portion of the image and to provide a segmented image.

4. The computer-implemented method of claim 2, further comprising removing objects from the segmented image according to object removal criteria to provide a cleaned and segmented image, wherein the identified image objects are clustered according to the cleaned and segmented image.

5. The computer-implemented method of claim 1, further comprising removing objects from the segmented image according to object removal criteria to provide a cleaned and segmented image, wherein the predefined object criteria further comprises a global intensity threshold and at least one of a size of the identified object, a predetermined intensity level, and a local density of other objects surrounding a given object in the segmented image.

6. The computer-implemented method of claim 1, wherein the quantitatively analyzing further comprises removing image objects from the image corresponding to at least one selected type of object according to predefined object criteria to provide a cleaned and segmented image, the identified image objects being clustered according to the cleaned and segmented image.

7. The computer-implemented method of claim 1, wherein the cleaned and segmented image includes image objects representing cell nuclei.

8. A computer-implemented method for analyzing an image, comprising:
   quantitatively analyzing image data to identify image objects relative to a background portion of the image according to predefined object criteria, the image data including a plurality of image objects that represent objects in a sample;
   clustering the identified image objects into groups or colonies of the identified image objects according to predefined clustering criteria; and
   wherein the image data further comprises at least first and second image sets acquired for substantially a same region of interest of the sample, the quantitatively analyzing and the clustering being performed on cleaned and segmented image sets for at least one of the first and second image sets, the method further comprising cross-correlating the first and second image sets to substantially align the respective first and second image sets and to provide an aligned image that includes groups or colonies of the image objects identified within the aligned image.

9. The computer-implemented method of claim 8, wherein at least one of the first and second image sets corresponds to image data acquired from the sample representing the presence of a predetermined marker that identifies at least one known characteristic, the method further comprising quantitatively correlating at least two of the first image set, the second image set and the aligned image set to identify at least one characteristic for the groups or colonies of the identified image objects.

10. The computer-implemented method of claim 9, wherein the identified image objects comprise cells, and the at least one characteristic further comprises at least one of a morphologic characteristic of at least one of the cells and the groups or colonies, immunochemical characteristic of the cells, histochemical characteristic of the cells, and characteristics revealed by in situ hybridization of the cells.

11. The computer-implemented method of claim 9, wherein the at least one characteristic further comprises a characteristic of telomeres located within identified groups or colonies of cells.

12. The computer-implemented method of claim 9, wherein the identified image objects comprise cells and the at least one characteristic further comprises at least one of a chemical feature or a morphologic feature in a matrix of materials adjacent the cells.

13. The computer-implemented method of claim 9, wherein the identified image objects comprise cells and the at least one characteristic further comprises at least one of a morphological or chemical feature of at least one of the cells and the groups or colonies that becomes identifiable by employing at least one alternative illumination or imaging condition for each of the at least first and second image sets, by employing different wavelength of illumination for each of the at least first and second image sets, by applying wave phase contrast for each of the at least first and second image sets, and by employing topographic mapping for each of the at least first and second image sets.

14. The computer-implemented method of claim 8, wherein at least one of the first and second image sets corresponds to image data acquired for the sample having been stained to express a predetermined marker, the method further comprising:
cross-correlating the cleaned and segmented image sets for each of the first and second image sets to align the respective image sets for a common region of interest;
adjusting the clustering criteria based on the cross-correlation; and
clustering the identified image objects into groups or colonies according to the adjusted clustering criteria.

15. The computer-implemented method of claim 14, wherein the quantitatively analyzing further comprises applying predetermined object removal criteria to provide a cleaned and segmented image, the clustering further comprises:
identifying groups or colonies of the identified image objects in the cleaned and segmented image; and
determining at least one morphological characteristic of image objects in the identified groups or colonies based on the cross-correlation.

16. The computer-implemented method of claim 15, wherein the clustering further comprises applying cluster removal criteria to a given identified group or colony, the cluster removal criteria varying according to the number of objects within the given identified group or colony.

17. The computer-implemented method of claim 16, wherein the cluster removal criteria comprises a first cluster removal criteria that removes a given group or cluster from the image if the given group or cluster contains less than a predetermined number of objects, the method further comprising applying at least one second cluster removal criteria to remove a given group or cluster from the image according to at least one of a measured dimension or an object density of the given group or cluster.

18. A computer-implemented method for analyzing an image, comprising:
quantitatively analyzing image data to identify image objects relative to a background portion of the image according to predefined object criteria, the image data including a plurality of image objects that represent objects in a sample;
clustering the identified image objects into groups or colonies of the identified image objects according to predefined clustering criteria; and
wherein the clustering further comprises:
separating the identified groups or colonies into different categories; and
applying the clustering criteria for each given identified group or colony, the clustering criteria varying according to which of the different categories the given group or colony belongs.

19. The computer-implemented method of claim 18, wherein the objects comprise at least one of cells or cell nuclei or cell organelles, the identified groups or colonies being separated into the different categories based on object density.

20. The computer-implemented method of claim 19, further comprising setting at least one clustering parameter as a function of the object density for identifying whether a given group or colony belongs to a first category of the different categories.

21. The computer-implemented method of claim 18, wherein the identified groups or colonies are separated into the different categories as a function of the type of objects in the sample.

22. A computer-implemented method for analyzing an image, comprising:
quantitatively analyzing image data to identify image objects relative to a background portion of the image according to predefined object criteria, the image data including a plurality of image objects that represent objects in a sample;
clustering the identified image objects into groups or colonies of the identified image objects according to predefined clustering criteria; and
wherein the clustering further comprises:
computing a distance map image for the cleaned and segmented image; and
segmenting the distance map image to cluster objects within a predetermined distance of each other into a respective group or colony of the identified image objects.

23. A computer-implemented method for analyzing an image, comprising:
quantitatively analyzing image data to identify image objects relative to a background portion of the image according to predefined object criteria, the image data including a plurality of image objects that represent objects in a sample;
clustering the identified image objects into groups or colonies of the identified image objects according to predefined clustering criteria; and
, wherein the sample includes a culture of progenitor cells, which correspond to the image objects, the method further comprising characterizing at least one feature of different groups or colonies of the progenitor cells.

24. The computer-implemented method of claim 23, wherein the at least one feature further comprises at least one of a number of the colonies, a number of progenitor cells in each of the colonies, a size of cells in each of the colonies, a size of nuclei within each colony, size of each of the colonies.

25. The computer-implemented method of claim 23, wherein the at least one feature further comprises an indication of whether the progenitor cells express a given marker.

26. The computer-implemented method of claim 25, the given marker comprising at least one of a morphological marker, an immunochemical marker, and a histochemical marker, and in situ hybridization marker.

27. The computer-implemented method of claim 23, wherein the at least one feature comprises at least one of a chemical feature or a morphologic feature in a matrix of materials adjacent the cells.

28. A computer-implemented method for analyzing an image, comprising:
quantitatively analyzing image data to identify image objects relative to a background portion of the image according to predefined object criteria, the image data including a plurality of image objects that represent objects in a sample;
clustering the identified image objects into groups or colonies of the identified image objects according to predefined clustering criteria; and
wherein the image is a montaged image, the method further comprises selecting a region of interest (ROI) in the montaged image, the ROI establishing boundaries in the image of the sample for performing the quantitative analysis and the clustering.

29. The computer-implemented method of claim 28, wherein the image data is acquired by an image acquisition system for a plurality of subsamples that collectively define the montaged image.

30. A computer-implemented method for analyzing an image, comprising:
quantitatively analyzing image data to identify image objects relative to a background portion of the image according to predefined object criteria, the image data including a plurality of image objects that represent objects in a sample;
clustering the identified image objects into groups or colonies of the identified image objects according to predefined clustering criteria; and
storing parameter values that parameterize the computer-implemented method, including at least a portion of the quantitatively analyzing and the clustering, at least a portion of the parameter values being user-selectable.

31. The computer-implemented method of claim 30, further comprising storing a plurality of templates, each of the plurality of templates comprising a set of stored parameter values that parameterize at least a portion of the computer-implemented method, the stored parameter values being adjustable based on information entered via an editor.

32. The computer-implemented method of claim 30, wherein each of a plurality of images are defined by respective sets of the image data, the method further comprising concurrently displaying selected portions of each of the plurality of images according to the parameter values, such that changes in at least one of the parameter values cause corresponding changes in the computer-implemented method, the concurrently displayed selected portions of the plurality of images being modified in response to the changes in at least one of the parameter values.

33. An image analysis system, comprising:
an image acquisition system that provides image data that defines an image having a plurality of image objects that represent corresponding objects in a physical sample, wherein the image acquisition system further comprises:
a stage that supports the sample;
an optical system that magnifies an image of at least a portion of the sample to a desired level; and
an image capture system that collects an image as an array of pixels, each pixel corresponding to part of the image of at least a portion of the sample, the image data representing at least a light intensity level for each of the pixels; and
an analysis engine that segments image objects relative to image background according to predefined object criteria to provide a segmented image, the analysis ermine clusters image objects in the segmented image into groups or colonies of the image objects according to predetermined clustering criteria;
wherein the image data comprises a montaged image formed from a plurality of images acquired by the image acquisition system for different parts of the sample, the analysis engine performing background correction and selecting a region of interest (ROI) in the montaged image, the ROI establishing boundaries of the montaged image for performing the segmentation and the clustering.

34. The system of claim 33, wherein the analysis engine is programmed to segment image objects and to provide the segmented image relative to the background portion of the image according to at least one segmentation parameter that parameterizes a segmentation algorithm.

35. The system of claim 34, wherein the analysis engine is programmed to calculate a size for the segmented image objects in the segmented image and to remove objects from the segmented image according to object removal criteria to provide a cleaned and segmented image, the predefined object criteria being set according to the at least one segmentation parameter, the analysis engine clustering the identified image objects in the cleaned and segmented image.

36. An image analysis system, comprising:
an image acquisition system that provides image data that defines an image having a plurality of image objects that represent corresponding objects in a physical sample; and
an analysis ermine that segments image objects relative to image background according to predefined object criteria to provide a segmented image, the analysis engine clusters image objects in the segmented image into groups or colonies of the image objects according to predetermined clustering criteria;
the image data further comprises at least first and second image sets acquired for the sample, the analysis engine performs the segmentation and clustering on at least one of the first and second image sets to provide segmented and clustered image sets for the at least one of the first and second image sets, the analysis engine cross-correlating the first and second image sets to align spatially the respective first and second image sets to facilitate analysis of the identified image objects in the first and second image sets.

37. The system of claim 36, wherein the image acquisition system further comprises:
a stage that supports the sample;
an optical system that magnifies an image of at least a portion of the sample to a desired level; and
an image capture system that collects an image as an array of pixels, each pixel corresponding to part of the image of at least a portion of the sample, the image data representing at least a light intensity level for each of the pixels.

38. The system of claim 36, wherein at least one of the first and second image sets corresponds to image data acquired for the sample having been stained to express at least one predetermined marker, the analysis engine correlating the first and second image sets to identify at least one characteristic for the groups or colonies of the identified image objects based on image objects in the groups or colonies of the identified image objects determined to express the at least one predetermined marker.

39. The system of claim 36, wherein the analysis engine determines the groups or colonies of the identified image objects for the first image set, the second image set corresponding to image data acquired for the sample having been stained to express a predetermined marker, the analysis engine correlating the first image set and the second image set to identify at least one characteristic for the groups or colonies of the identified image objects according to which image objects in the second image represent objects that express the predetermined marker.

40. The system of claim 36, wherein the identified image objects comprise cells, and the at least one characteristic further comprises at least one of a morphologic characteristic of at least one of the cells and the groups or colonies, immunochemical characteristic of the cells, histochemical characteristic of the cells, and characteristics revealed by in situ hybridization of the cells.

41. An image analysis system, comprising:
an image acquisition system that provides image data that defines an image having a plurality of image objects that represent corresponding objects in a physical sample; and
an analysis engine that segments image objects relative to image background according to predefined object criteria to provide a segmented image, the analysis ermine clusters image objects in the segmented image into groups or colonies of the image objects according to predetermined clustering criteria;
wherein the analysis engine applies cluster removal criteria to each given identified group or colony, the cluster removal criteria varying according to the number of objects within the given identified group or colony.

42. An image analysis system, comprising:
an image acquisition system that provides image data that defines an image having a plurality of image objects that represent corresponding objects in a physical sample; and
an analysis engine that segments image objects relative to image background according to predefined object criteria to provide a segmented image, the analysis ermine clusters image objects in the segmented image into groups or colonies of the image objects according to predetermined clustering criteria;
wherein the analysis engine provides identifying data that specifically localizes at least one of an object and a group or colony within two regions of interest (ROI) in at least first and second images based on the at least one object and the group or colony exhibiting defined selection criteria.

43. The system of claim 42, wherein the at least one object and the group or colony at the location corresponding to the identifying data represents one or more viable cell.

44. An image analysis system, comprising:
an image acquisition system that provides image data that defines an image having a plurality of image objects that represent corresponding objects in a physical sample; and
an analysis engine that segments image objects relative to image background according to predefined object criteria to provide a segmented image, the analysis engine clusters image objects in the segmented image into groups or colonies of the image objects according to predetermined clustering criteria;
wherein the predefined object criteria and the predefined clustering criteria correspond to stored parameters that parameterize at least a portion of an image analysis process employed by the analysis engine, the system further comprising an editor control programmed to change at least one of the parameters.

45. The system of claim 44, further comprising a display that concurrently displays a representation of each of a plurality of images defined by respective sets of the image data, the concurrently displayed representation of each of the plurality of images being modified in response to the changes in the at least one of the parameters that cause changes in the parameterization of the image analysis process employed by the analysis engine.

46. The system of claim 44, further comprising at least one template that includes a set the stored parameters, the at least one template being selectable by the editor control to parameterize at least a portion of the of the image analysis process employed by the analysis engine, the editor control also being programmed to modify at least one of the parameters of the at least one template.

* * * * *

UNITED STATES PATENT AND TRADEMARK OFFICE
CERTIFICATE OF CORRECTION

PATENT NO.       : 7,796,815 B2                          Page 1 of 1
APPLICATION NO.  : 11/450125
DATED            : September 14, 2010
INVENTOR(S)      : George F. Muschler et al.

It is certified that error appears in the above-identified patent and that said Letters Patent is hereby corrected as shown below:

Column 24, line 33, after "an analysis" delete "ermine" and insert --engine--

Signed and Sealed this

Ninth Day of November, 2010

David J. Kappos
*Director of the United States Patent and Trademark Office*